(12) United States Patent
Leone

(10) Patent No.: US 7,631,574 B2
(45) Date of Patent: Dec. 15, 2009

(54) ACCELERATOR PEDAL FOR A MOTOR VEHICLE

(75) Inventor: Carmelo Leone, Neufahrn (DE)

(73) Assignee: AB Electronic GmbH, Werne (DE)

( * ) Notice: Subject to any disclaimer, the term of this patent is extended or adjusted under 35 U.S.C. 154(b) by 890 days.

(21) Appl. No.: 11/143,354

(22) Filed: Jun. 2, 2005

(65) Prior Publication Data
US 2007/0000345 A1   Jan. 4, 2007

(30) Foreign Application Priority Data
Jun. 5, 2004   (DE)   .................. 10 2004 027 610

(51) Int. Cl.
G05G 1/14   (2006.01)
G05G 1/30   (2006.01)
(52) U.S. Cl. .................. 74/513; 74/512; 74/560
(58) Field of Classification Search ........... 74/512–514, 74/560, 478; 477/115, 187; 180/334; G05G 1/14; B60K 26/02
See application file for complete search history.

(56) References Cited

U.S. PATENT DOCUMENTS

| | | | | |
|---|---|---|---|---|
| 6,330,838 | B1 * | 12/2001 | Kalsi ........................... | 74/514 |
| 6,474,191 | B1 * | 11/2002 | Campbell ..................... | 74/514 |
| 6,689,016 | B2 * | 2/2004 | Apel ............................ | 477/115 |
| 7,044,019 | B2 * | 5/2006 | Hauschopp et al. .......... | 74/512 |
| 7,212,914 | B2 * | 5/2007 | Wilczek et ................... | 701/115 |
| 7,216,563 | B2 * | 5/2007 | Willemsen et al. ........... | 74/512 |
| 2003/0217614 | A1 * | 11/2003 | Hauschopp et al. .......... | 74/512 |
| 2004/0259687 | A1 * | 12/2004 | Ritter et al. .................. | 477/187 |

FOREIGN PATENT DOCUMENTS

| | | |
|---|---|---|
| DE | 101 04 872 A1 | 2/2001 |
| DE | 102 38 483 A1 | 6/2002 |
| DE | 10 2005 059 975 A1 * | 6/2007 |
| EP | 1 346 868 A1 | 2/2003 |
| EP | 1 369 763 A2 | 5/2003 |
| EP | 1 375 233 | 1/2004 |
| JP | 2005-231194 | 9/2005 |
| WO | WO 00/56566 | 9/2000 |
| WO | WO 03/039899 A2 | 5/2003 |

* cited by examiner

*Primary Examiner*—Vinh T. Luong
(74) *Attorney, Agent, or Firm*—Juliann Gaddy; Eckert Seamans Cherin & Mellott, LLC

(57) ABSTRACT

A pedal assembly includes a pedal element 12 that may be displaced with respect to a base element 14 along its actuation path. The pedal element 12 may swivel out along the actuation direction B. A rotating element 26 is so linked to the pedal element 12 so that it rotates upon displacement of the pedal element 12. At least one return element 34, 35 is provided to return the pedal element 12 against the actuation direction. Further, the pedal assembly includes an electric motor 20 to create opposing force. A neutral coupling unit 54 is provided between the rotating element 26 and the drive device 20, preferably with a first stop 64 on the rotor, and a second stop 64 at the rotating element 26. A freewheel clutch unit 54 couples the rotor 24 and the rotating element 26 upon displacement along the actuation direction B, but allows separate motion against the actuation direction B. A sensor (32) is provided to position the pedal element (12).

10 Claims, 5 Drawing Sheets

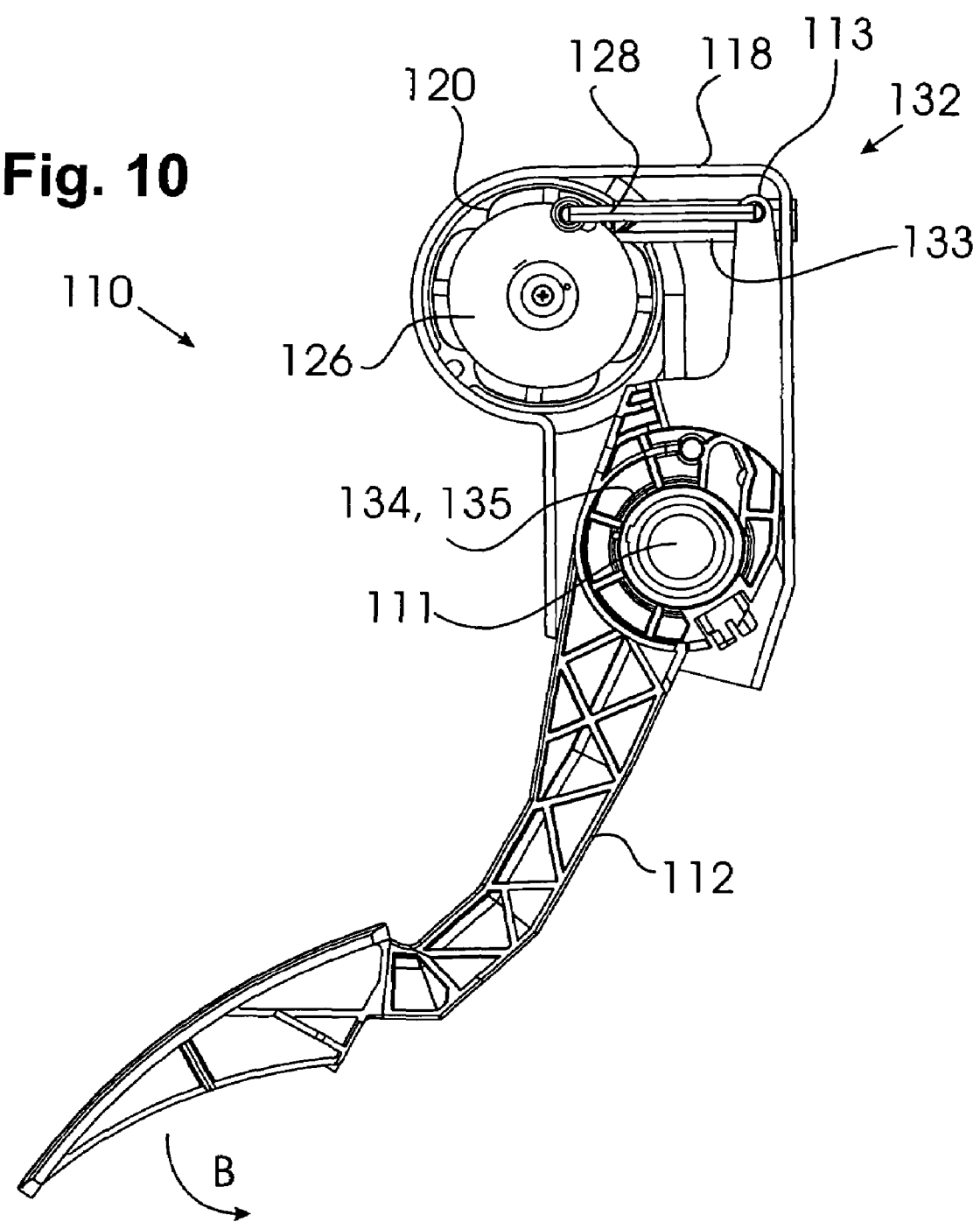

ACCELERATOR PEDAL FOR A MOTOR VEHICLE

BACKGROUND OF THE INVENTION

The invention relates to an accelerator pedal, a pedal assembly, and a motor vehicle.

Accelerator pedals for automobiles with integrated drive devices, so-called "force-feedback pedals", are known from EP-A-1346 868 and EP-A-1369 763.

EP-A-1346 868 describes a pedal unit in which the pedal element is moveable along an actuation path with respect to a base element. Two return elements are provided to return the pedal element to its initial position. A torque motor is provided on the pedal rotation axis whose stator is attached to the base element, and whose rotor is coupled with the pedal element. The torque motor is connected with a pedal control unit in the form of a microprocessor that includes a control sensor element, e.g., a speed sensor, separation sensor, or temperature sensor. Depending on the measurement value determined by the sensor and a normal condition stored in a buffer, the pedal causes actuation of the torque motor in order to alert the driver of exceeding the normal condition via an increase in the force acting against pedal pressure.

EP-A-1369 763 describes a pedal unit for an automobile that also includes a torque motor as a drive device. A pedal element that may be displaced with respect to a base element includes an accelerator element that causes rotation of a rotational element as the gas pedal is depressed along an actuation path. From the position of the rotational element, the pedal sensor unit creates a corresponding signal for further processing in a throttle unit of the vehicle engine. Spring elements act on the rotating element by means of pedal cables so that the pedal element without actuation pressure will always be returned to its initial position. The torque motor is mounted at a distance from the rotating element, and is connected with it using a motor cable so that the force acting against pedal depression may be adjusted by controlling the engine.

So that emergency operation is possible during a breakdown and potential engine stall, a coupling device is mounted between the engine and the pedal element, e.g., as a ratcheting coupling, pin coupling, motor clutch, multi-disk clutch, or release clutch. The coupling unit consists of two bodies that during normal operation are so held together that they behave as one body. When the engine unit is stopped and blocked, this condition is relieved by strong actuation of the pedal element. For this, depending on implementation, engaged teeth are released, a pin is broken at an intended shear point, or a cable is stretched. Emergency mode is then possible, i.e., the automobile may be driven to a workshop for repair of the unit.

WO-A-03/039899 discloses a number of different embodiments of pedal units with additional return element force. An electromechanical actuator provides additional repositioning force to a pedal element when the actual vehicle speed varies from a nominal speed. The devices are to be so shaped that the actuator itself may not increase vehicle speed under any circumstances. It is further to be ensured that the vehicle driver maintains complete control of the vehicle and actuates the gas pedal correspondingly against the increased force, i.e., he may 'overpower' it.

In one embodiment (FIG. 25a, 25b), a pedal element and a pedal housing as base element are provided. The pedal element may pivot with respect to the base element. A rotating disk is so coupled with the pedal element via a lever that it rotates as the pedal element is moved. An electric motor with a rotor and a stator is provided within the pedal housing as a controllable drive device. The force of the stator is transferred to the rotating disk via a transmission device with gear wheels or a toothed belt. The transmission device includes a coupling unit with strike surfaces whereby the engine and rotating disk are coupled when the strike surfaces are engaged with each other.

DE-A-102 38 483 shows a pedal unit element with a pedal element that is so coupled with a rotating element via a lever so that the rotating element rotates when the pedal element is moved. A first return element spring grips the rotating element so that the pedal element is returned by means of a return force. A second return element spring includes a stop that engages with the rotating element after specified depression of the pedal element so that the second return element spring provides additional return element force. A motor drives a setting cylinder via a toothed rod that sets the drive cylinder and thus yields to the depression point after which the additional return element force becomes effective.

In WO-A-03/039899, various embodiments of pedal units are shown in which the force of a motor is used in order to provide additional force on a pedal element. In one embodiment (FIG. 25 a-d), a coupling unit including strike surfaces is positioned in the working path between the motor and the pedal. The motor's rotor drives a first part of the coupling, and a second part of the coupling is coupled via a drive belt to a rotating element that is so linked with the pedal element via a lever that it rotates upon actuation.

SUMMARY OF THE INVENTION

Starting from these known pedal units with a drive device, it is the objective of the invention to provide a pedal unit, a pedal assembly, and a motor vehicle that are assembled especially compactly.

This objective is achieved by a pedal unit, a pedal assembly, and a motor vehicle based on the invention as described below.

The pedal unit includes a pedal element, a base element, a rotating element, a return element, a sensor, and a controllable drive device with a rotor and a stator element. The rotating element is so coupled with the pedal element that it rotates when the pedal element moves. The stator element of the motor is preferably firmly attached to the base element. The rotor of the electric motor is driven to rotate with respect to the stator. The drive device and the pedal element are so coupled by means of a freewheel clutch unit that the drive device can influence the motion of the pedal element along the actuation direction, and can apply an opposing force to it. The pedal element may, however, be returned against the actuation direction independent of the drive device. The sensor is coupled with the rotating element.

The present invention provides that:

The rotor and the rotating element are mounted adjacent to each other and so that they may be rotated about a common axis;

The freewheel clutch unit is positioned between rotor element and rotating element; and The sensor is implemented as a rotation sensor, and is positioned as an extension of the common rotational axis of the rotor and the rotating element.

A particularly compact unit is thus created. The unit may be assembled using relatively fewer parts in comparison to the state of the art, and may therefore be produced relatively cheaply. Large, expensive, and vulnerable transmission devices are no longer required between the drive device and rotating element.

Because of its mounting position on the rotating element, the sensor value depends on the actual position of the pedal element, and the sensor value is not influenced by a blocking or slowly-returning drive unit. A rotation sensor may alternatively or additionally be provided also for the position of the rotor. The rotation sensor is positioned along the extension of the common rotational axis of the rotor and of the rotating element. Thus, a particularly advantageous, very compact unit may be realized in which the assemblies required for the function—namely, the motor with stator and rotor, the rotating element, and the sensor—are mounted immediately adjacent to one another on a common axis.

The freewheel clutch unit preferably includes a first stop on the rotor element and a second stop on the rotating element. Upon actuation of the pedal element, i.e., application of force to the pedal in the actuation direction, the strike surfaces engage with one another. In this case, the freewheel clutch unit is thus engaged so that a positive coupling exists between the drive device and pedal element. However, the stop elements may be disengaged from one another upon motion of the pedal element against the actuation direction. In this direction, the freewheel clutch unit does not engage.

The freewheel clutch unit is preferably of very simple design in which the rotor and rotating element are formed as disks. The strike surfaces are formed as recesses or raised areas. This simple, compact design achieves function in which positive operation is possible since a blocking or slowly-returning drive device is without influence on the return of the pedal element. When the pedal element is used as an accelerator pedal in a motor vehicle, it is thus ensured that the accelerator pedal cannot be pressed down or held down by the drive device against the will of the driver.

In an expanded embodiment of the invention, a spring element is provided whereby its spring force presses the stop elements together. The freewheel clutch unit is so loaded by the spring element that the strike surfaces engage with one another. For this, a separate position sensor is not necessary for determination of the position of the drive device since it always follows the position of the pedal element during normal operation.

In an expanded embodiment of the invention, it is provided that the return element, or in the case of several return elements, at least one return element, is coupled with the rotating element, i.e., the pedal-side part of the freewheel clutch unit. The return element may thus cause a return force even without operation of the drive device, whereby the engaging elements disengage from one another. This also possesses the advantage even during normal fault-free operation that the return of the pedal may occur spontaneously, and is free from resistance caused by the motor.

A torque motor is preferably used that possesses a number of field coils on the stator, and at least one permanent magnet on the rotor. The motor may be used directly, without a transmission. Use of a disk-shaped rotor with permanent magnet elements allows a very compact design.

According to an advantageous embodiment, the base element includes a pedal housing, and a drive control unit to control the drive device is mounted within the housing. The drive control unit with an electric motor provides the necessary electrical power. A male plug connector is provided for connection to a vehicle electrical system. An electrical line in the form of a stamped grid assembly with multiple conductors is provided to provide a particularly simple and strong coupling of the drive device and the sensor unit as necessary with the male plug connector. This grid is at least partially embedded in the wall of the pedal housing, possibly made of plastic.

Further, the present invention relates to a pedal assembly with the previously described pedal unit and a pedal control unit. The pedal control unit need not be a separate component, but rather may be a component of the vehicle electrical system. For example, there may be a microprocessor in addition to the pedal control unit to which additional control tasks within the vehicle may be assigned. The pedal control unit prescribes the force to be generated by the drive device. This prescription is based on signals or measurement values that are provided to the pedal control unit, whereby the signals or measurement values designate situations such as excessive speed in which the driver is to be informed by means of an increased opposing pedal force.

For a full understanding of the present invention, reference should now be made to the following detailed description of the preferred embodiments of the invention as illustrated in the accompanying drawings.

BRIEF DESCRIPTION OF THE DRAWINGS

FIG. 10 is a schematic side view of a second embodiment example of a pedal unit.

DESCRIPTION OF THE PREFERRED EMBODIMENTS

Figure 1:
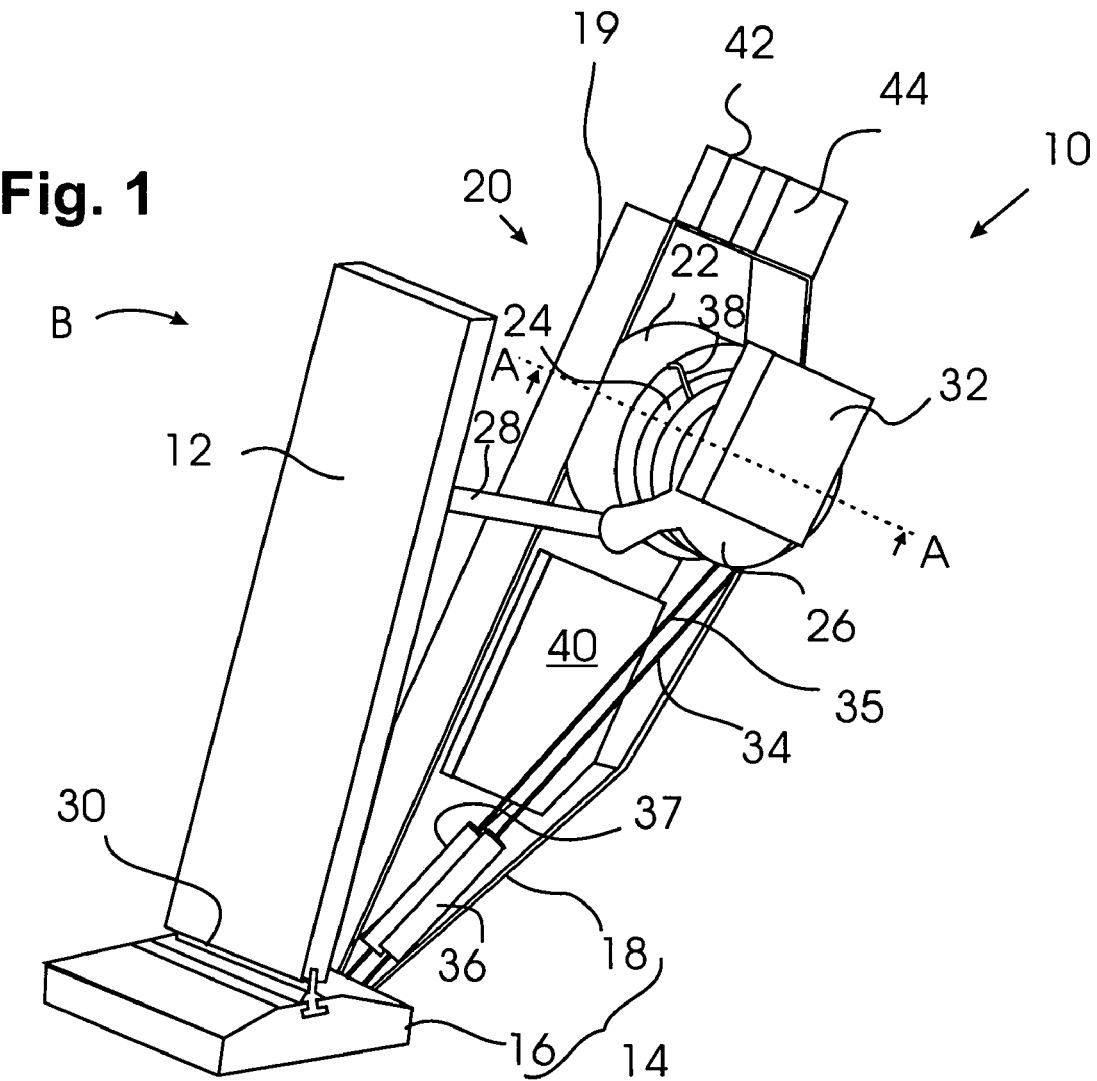
FIG. 1 is a perspective view of a first embodiment of a pedal unit with partially removed housing.
Figure 2:
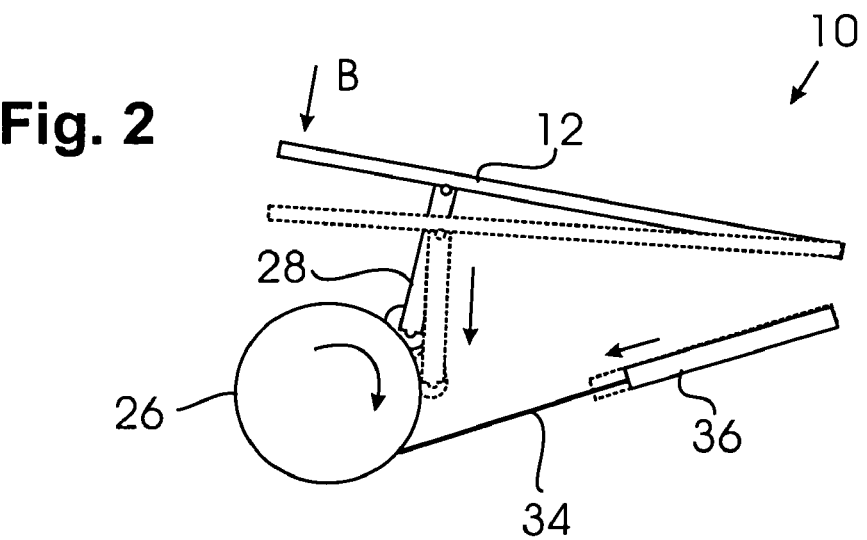
FIG. 2 is a schematic view of a pedal element and a rotating element.

The preferred embodiments of the present invention will now be described with reference to FIGS. 1-10 of the drawings. Identical elements in the figures are designated with the same reference numerals.

FIG. 1 shows a first embodiment of a pedal unit 10 with a pedal element 12 and a base element 14 consisting of a base plate 16 and a base element housing 18 with a base element housing wall 19. The base element housing 18 is shown partially open.

The pedal unit 10 is an accelerator pedal of a motor vehicle. For this, the base element 14 is firmly attached to the vehicle. The pedal unit 10 is implemented as a standing pedal.

Within the base element housing are located a torque motor 20 with a stator 22 and a rotor 24. The rotor 24 is disk-shaped. A clutch disk 26 is positioned next to the rotor 24 that is coupled with the pedal element 12 by means of a lever element 28.

The pedal element 12 is linked to the base element 16 by means of a film hinge 30 so that it may pivot with respect to the base element 14. Upon actuation of the pedal element 12 along the actuation direction B, the clutch disk 26 within the base element housing 18 is rotated by means of the lever element 28. The rotational position of the disk 26 is determined by means of the sensor unit 32 affixed within the base element housing.

The sensor unit 16, shown here symbolically, may be a magnetic sensor (for example, based on the Hall principle or as a magneto-restrictive sensor), an inductive sensor, or a sensor operating potentiometrically.

Figure 3:
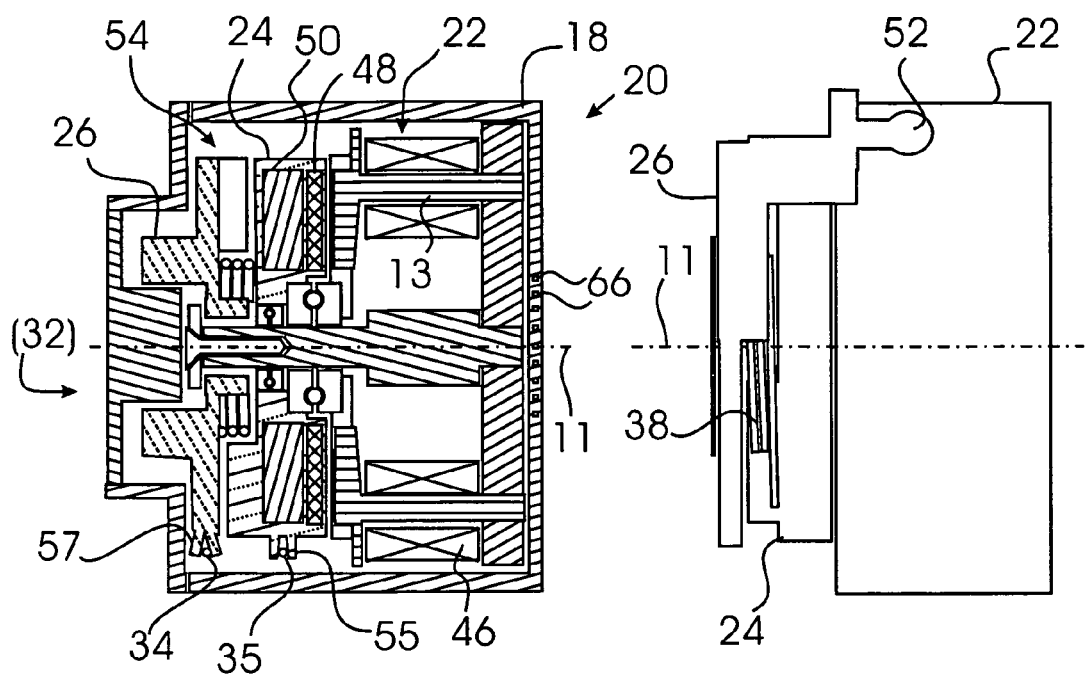
FIG. 3 is a sectional view taken at the plane A-A indicated in FIG. 1 through a part of the pedal element as in FIG. 1.

The pedal unit 10 includes a first return element 34 in the form of a first cable with a spring 36, and a second, similar return element 35 with a spring 37. The cable 35 acts on the rotor element 24 of the motor. As FIG. 3 shows, this is where it is guided into a guide element 55 formed as a trough as the rotor element rotates. The first return element 34 acts on the rotating disk 26, where it is guided into a slot 57, again as FIG. 3 shows. As an additional spring element, a spiral leg spring 38 is provided that is mounted between the rotor element 24 and the rotating disk 26, and of which only a leg is visible in FIG. 1.

For electrical control of the motor 20, the base element housing 18 receives an electronic performance unit 40 in the form of a circuit board with a performance driver circuit on it. On the face end of the base element housing 18 are located two male connector plugs 42, 44. The plug housings are formed as one piece with the base element housing as an injection-molding part, whereby the contact lugs (not shown) standing free in the plug housings for electrical contact are a part of a stamped grid that is formed into the walls of the base element housing 18.

Figure 9:
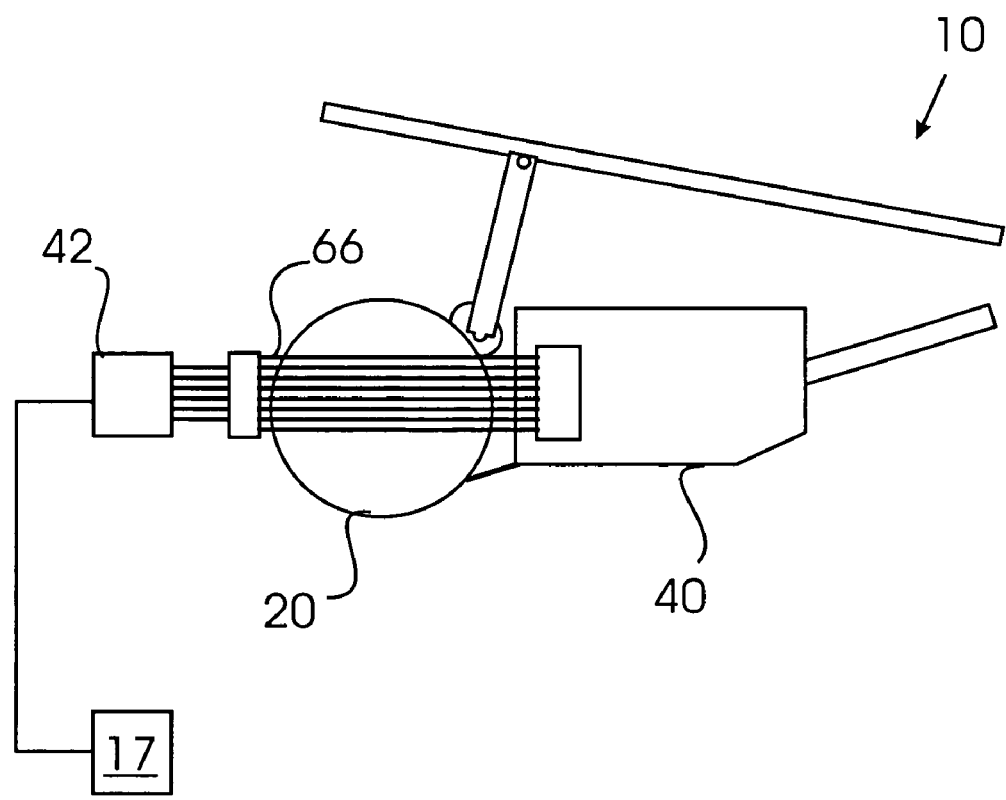
FIG. 9 is a schematic side view of elements of the pedal unit as in FIG. 1.

FIG. 9 shows a side view of a symbolic representation of the elements of the pedal unit 10. One may recognize that the electrical lines to the plug connector 42, the connection of the connector plug 42 with the motor 20, and the performance driver circuit 40 are formed by a stamped grid 66. The stamped grid 66 is molded into the walls of the base element housing, as is visible in the cutaway in FIG. 3.

FIG. 2 again shows a symbolic representation of the function of the pedal unit 10. Upon actuation of the pedal element 12 along the actuation direction B, the linked lever element 28 rotates the rotating disk 26 and the rotor 24 coupled with it. The return element 34 acts against this, whereby a pre-defined return force is applied by means of the spring 36.

The following is an explanation of the design and function of the functional units mounted within the base element housing 18 with reference to FIGS. 3-7, 8a, and 8b.

FIG. 3 shows a cross-section through the base element housing 18 at the height of the motor 20. The stator 22 of the motor 20 includes four sector-shaped field coils 46 positioned about the circumference with core elements 13. A desired field strength and polarity is created within each quadrant of the side surface facing the rotor 24 by means of the circumferential sector-shaped field coils positioned in each quadrant.

The rotor 24 mounted opposite the stator 22 so that it may rotate includes a ring element 48. The ring element 48 is a permanent magnet. For this, the ring disk is divided into four sectors corresponding to the field coils 46, whereby adjacent sectors are magnetized in opposition. A ring-shaped soft iron core 50 is provided behind the ring element 48.

The motor 20 operates as a torque motor, whereby field strength and polarity are so selected by means of the current applied to the coils 46 that a specific angular position of the rotor 24 or a specified torque is set. The peculiarity of a torque motor is that relatively high torques may be created directly. However, the rotational range of the rotor in this example of a motor with four poles is limited to less than 90°. In alternative implementations, the motor 20 may include a different number of poles so that even a deviating upper limit of the rotational range results (e.g., 180° for two poles, 120° for three poles, etc.).

The rotation sensor 32 from FIG. 1 is not shown in FIG. 1 in detail. It is preferably a Hall-effect rotation sensor or an inductive rotation sensor. Each of these includes a stator part (firmly affixed to the base element housing 18) and a rotor part (that rotates with the rotating disk 26). The relative position of stator and rotor is determined, and is transmitted as an electrical signal. The sensor 32 may be mounted either inside or outside the housing at the indicated location (32). The sensor 32 is located along the extension of the common rotational axis of motor 20 and coupling 54.

Figure 4:
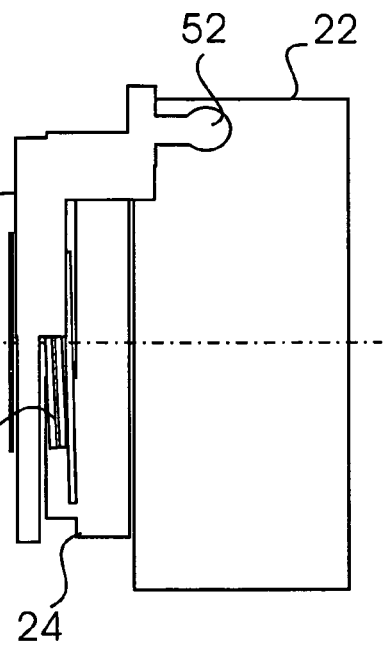
FIG. 4 is a front view of a part of the pedal element as in FIG. 1.

As FIGS. 3 and 4 show, the rotating disk 26 is mounted next to the rotor 24 along a common axis 11. The rotating disk 26 includes a projecting dog 52 against which the lever element 28 of the pedal element 12 rests.

The motor 20 is to oppose the rotational motion with a controlled counter-force resulting from actuation of the pedal element 26. For this, a rotor 24 is coupled with the rotating disk 26 via a freewheel clutch unit that is implemented between rotor 24 and rotating disk 26.

As already mentioned in connection with FIG. 1, the pedal assembly includes two separate return elements 34, 35 that return the rotor 24 and rotating disk 26 independently of each other.

Figure 5:
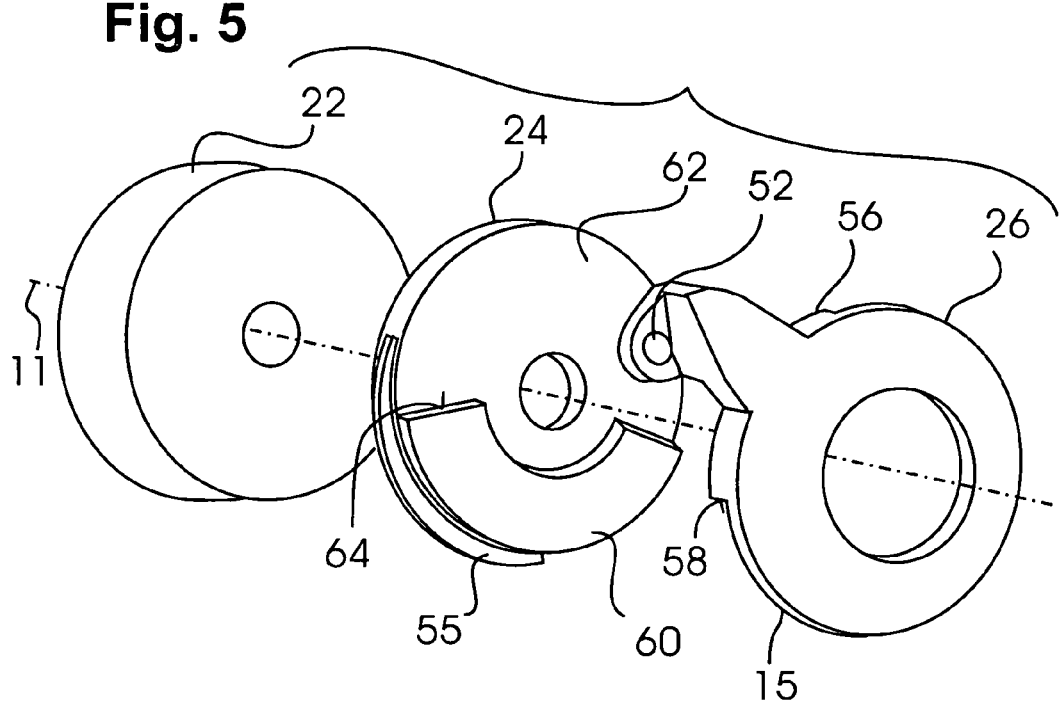
FIG. 5 is an exploded perspective view of elements of the part as in FIG. 4.
Figure 6:
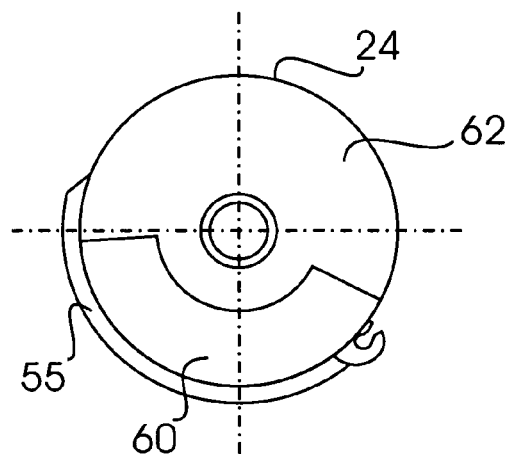
FIG. 6 is a side view of a rotor element.
Figure 7:
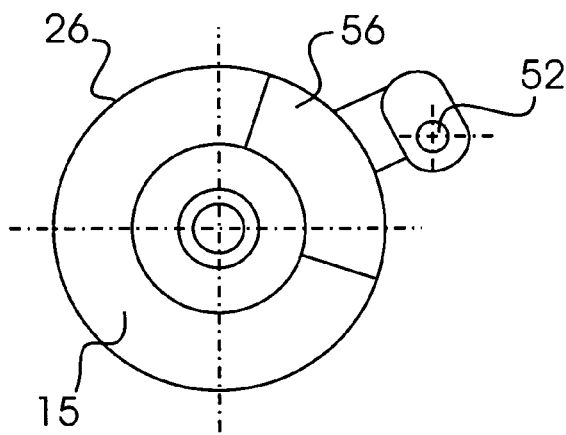
FIG. 7 is a side view of a rotating element.

As may be taken from FIGS. 6 and 7, as well as from the exploded representation in FIG. 5, the rotating disk 26 includes a sector-shaped projection 56, about 90° wide in the shown example, that projects beyond the remaining circular ring along the axial direction. This forms a strike surface 58 acting along the circumference and a correspondingly axially recessed area 15.

On the other side, the rotor 24 includes an axially-projecting area 60 about 150° wide in the illustrated example, and correspondingly, an axially-recessed area 62 about 210° wide. A strike surface 64 acting along the circumference is formed on one end of the projecting area 60.

Rotating disk 26 and rotor 24 are so mounted together to form the freewheel clutch unit 54 that each projecting area 56, 60 of each element engages with each of the axially recessed areas 56, of the opposing element. Thus, the strike surfaces 58, 64 oppose each other in corresponding rotational position. The rotating disk 26 may be rotated with respect to the rotor 24 through an angular range of about 120°.

Figure 8A:
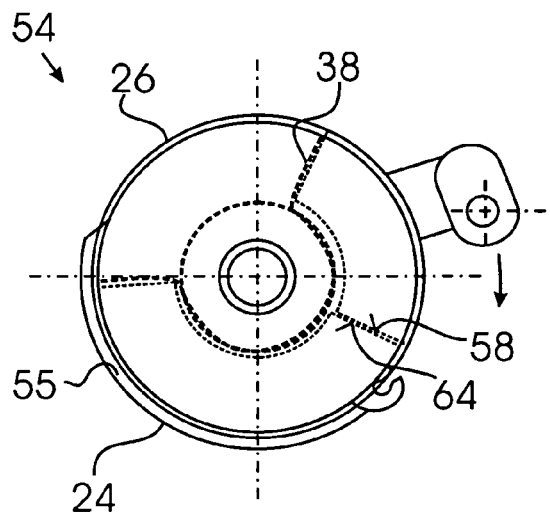
FIG. 8a, 8b are side views of a freewheel clutch unit in various positions.
Figure 8B:
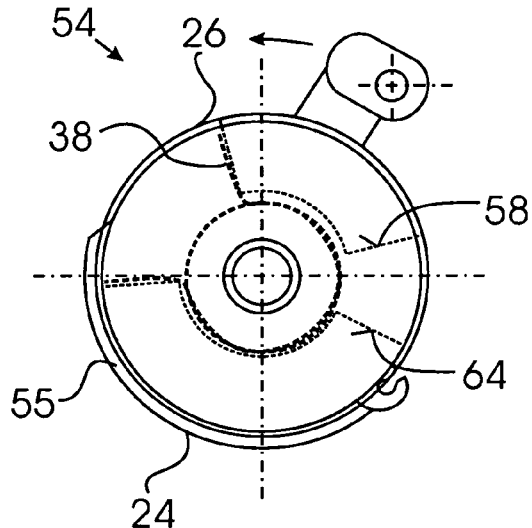

The correspondingly assembled freewheel clutch unit 54 is shown in a side view in FIGS. 8a and 8b in various positions.

If the rotating disk 26 is rotated along the actuation direction B by means of actuation of the pedal element 12 (clockwise in FIG. 8a), then the strike surfaces 58, 64 engage with each other. Force on, or movement of, the pedal element 12 is thus coupled with the rotor 24 along the direction of motion. Thus, corresponding application of current to the field coils 46 of the motor 20 makes it possible to create specific opposing forces with respect to the actuation movement that are then coupled via the freewheel clutch unit 54 to the pedal element 12.

In contrast, FIG. 8b shows the freewheel clutch unit 54 during a return element movement of the pedal element 12. For this, the rotating disk 26 rotates counter-clockwise. As is visible in FIG. 8b, the return element movement of the rotating disk 26 occurs independent of the rotor 24, i.e., during blocking or very slow return movement of the rotor 24, rapid return of the pedal element 12 counter-clockwise occurs nevertheless by means of the return element 34. In this direction, the freewheel clutch unit 54 does not engage.

The leg spring presses the strike surfaces 58, 64 apart so that the freewheel clutch unit 54 is held together during normal operation. The spring 38 is, however, so configured that its spring force is relatively small in comparison with the return elements 34, 35. The torque generated by the spring 38 is clearly smaller than the return moment from the cable element 34. The return element of the rotating disk 26 is therefore ensured even when the rotor 24 is motionless.

In the following, the function of the pedal unit 10 is again explained:

The pedal assembly serves in a motor vehicle as an accelerator pedal unit. The vehicle driver actuates the pedal element 12 along the actuation direction, causing the rotating element 26 to rotate. The position of the rotating element 26 is determined by the sensor 32, and is transmitted via the plug connector 44 to the vehicle engine control unit. From there, a corresponding position of the throttle plate is specified.

The actuation movement opposes the force of the return elements 34, 35 in a motor 20 assumed to be without current, whereby the return element 35 acts on the rotor 24 and the return element 34 acts on the rotating disk 26. Under reduced actuation force, the pedal element thus returns. During this, the rotor 24 is also returned so that the strike surfaces 58, 64 remain engaged. The spring 38 also causes the strike surfaces 58, 64 to be pressed together during normal operation. Thus, a separate sensor to determine the position of the rotor 24 is not required.

The fact that the return element 34 acts directly on the rotating disk 26, i.e., the pedal-side part of the freewheel clutch unit, provides spontaneous return that is free of any resistance by the motor 20 which possesses greater mass. The return is also immediately detected and reported by the sensor 31.

A control signal used to create an opposing force is now transmitted from a pedal control unit 17 via the plug contact 42. Using the opposing force that is constant but may also be variable by time, the driver is signaled in that he is made aware of a hazardous driving situation (following too close or excessive speed) by the opposing force. The control signal is converted in the electronic performance unit 40 into a corresponding current load of the field coils 46 of the stator 22. This causes corresponding torque on the rotor 24, namely against the actuation direction (i.e., counter-clockwise in FIGS. 8a, 8b).

If the pedal assembly 12 is already located in a position that is depressed along the actuation path B, or if the driver attempts to actuate the pedal element 12, in addition to the force from the return elements 34, 35 he feels the force from the motor 20 that is transferred via the freewheel clutch unit that is engaged in this direction. The vehicle driver may overcome this opposing force by increasing pedal force, but will notice the increased opposing force and will react accordingly.

If the vehicle driver reduces actuation of the pedal element 12, it is reset by means of the return elements 34, 35 and, potentially, by the force of the torque motor 20.

If the rotor becomes blocked during this, e.g., by improper control of the motor 20, then this blocking of the rotor 24 does not lead to blocking of the rotating disk 26 and thus to the pedal element 12 being held down. In this case, the return element 34 acts upon the rotating disk 26 that releases the strike surface 58 of the rotating disk 26 is released from the strike surface 64 of the rotor 24 against the spring 38, as FIG. 8b shows, and the pedal element 12 is also returned to its initial position even if the rotor is motionless.

Any number of variations to the embodiment described above are conceivable. In particular, one or both return elements 34, 35 may be implemented as a coil or leg springs.

Instead of the two plug connectors 42, 44 shown in FIG. 1, a common plug with a proper number of contacts may be provided for control of the motor on the one hand and for the transmission of sensor signals on the other.

FIG. 10 shows a second embodiment example of a pedal assembly 110 in side view. The pedal assembly 110 is designed functionally identical to the pedal unit 10 described above. In contrast to it, it is implemented with a hanging pedal.

A torque motor 120 is mounted within a base element housing 118. a pedal element 112 is mounted at a pedal pivot point so that it may pivot. A lever element 128 transfers the pivoting motion of the pedal element 112 to a rotating disk 126.

As a person skilled in the art will easily realize, the hanging pedal shown in FIG. 10 largely corresponds to the first embodiment. As explained there, the rotating disk 126 is coupled with a rotor unit of the torque motor 120 mounted behind it via a freewheel clutch unit as described (not visible in FIG. 10). In the following, the differences between the embodiments will be explained.

In the pedal assembly 110, an inductive sensor 132 is provided as a position sensor for the position of the pedal element 112. For this, a resonance circuit with a capacitor and an inductor are provided as an inductive coupling element at one end 113 of the pedal element 112. On a spar 133, an inductive circuit with two sending coils and one receiver coil is provided that extends along the entire path described by the resonance circuit during actuation of the pedal element 112. The position of the pedal element 112 with respect to the fixed spar 133 may be determined very accurately by means of the position-dependent coupling of the sending coils with the receiver coil, by means of the resonance circuit. An appropriate sensor is described, for example, in WO-A-03/038379.

As in the first embodiment, there are also two separate return elements 134, 135 provided in the pedal assembly 110 to return the pedal element 112. These are implemented as coil springs about the pedal pivot point 110.

There has thus been shown and described a novel accelerator pedal, pedal assembly and motor vehicle which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An accelerator pedal unit comprising:
   (a) a base element;
   (b) a pedal element that may be displaced with respect to the base element along an actuation direction (B);
   (c) a rotating element that is linked to the pedal element such that said rotating element rotates upon displacement of the pedal element;
   (d) at least one return element to return the pedal element in a direction opposite to the actuation direction (B);
   (e) an electric drive device with a rotor and a stator element to create opposing force against pedal depression, said rotor and said rotating element being mounted adjacent to each other along a common axis; and
   (f) a freewheel clutch unit, positioned between the rotor and the rotating element, for coupling the rotor and the rotating element, upon actuation of the pedal element along the actuation direction (B), such that the opposing force generated by the electric drive device acts on the pedal element, but which allows separate motion opposite the actuation direction (B);

(g) a rotation sensor, coupled to the rotating element, positioned along an extension of the common axis of the rotor and the rotating element.

2. Pedal unit as recited in claim 1, wherein a freewheel clutch unit includes a first strike surface element on the rotor element and a second strike surface element on the rotating element, whereby the strike-surface elements engage upon actuation of the pedal element, and the strike surface elements are separated from each other upon return of the pedal element.

3. Pedal unit as recited in claim 2, further comprising a spring element positioned between the rotor element and the rotating element, such that the strike surface elements are pressed together.

4. Pedal unit as recited in claim 1, wherein the rotor element and the rotating element are disk-shaped and rest one upon the other, and wherein the strike surface elements are formed as at least one of projections and recesses.

5. Pedal unit as recited in claim 1, wherein said at least one return element is coupled to the rotating element.

6. Pedal unit as recited in claim 1, wherein the electric drive device is a torque motor, the stator element includes a number of field coils, and the rotor includes at least one magnet.

7. A pedal unit as recited in claim 1, wherein the base element includes a pedal housing, and further comprising a drive control unit mounted within the housing for controlling the electric drive device, at least one male plug connector for electrical connection of at least one of the drive control unit and the rotation sensor, and a stamped grid assembly for electrical connection of at least one of the drive control unit and the rotation sensor at least partially embedded into a wall of the pedal housing along with the plug connector.

8. A pedal assembly comprising a pedal unit as recited in claim 1 and a pedal control unit, coupled to the electric drive device, for determining the opposing force to be produced by the electric drive device.

9. A motor vehicle comprising a pedal assembly as recited in claim 8.

10. A motor vehicle comprising a pedal unit as recited in claim 1.

* * * * *